United States Patent
Hegarty et al.

(10) Patent No.: US 11,676,293 B2
(45) Date of Patent: Jun. 13, 2023

(54) METHODS FOR DEPTH SENSING USING CANDIDATE IMAGES SELECTED BASED ON AN EPIPOLAR LINE

(71) Applicant: META PLATFORMS TECHNOLOGIES, LLC, Menlo Park, CA (US)

(72) Inventors: James Steven Hegarty, Kirkland, WA (US); Zijian Wang, Bothell, WA (US); Steven John Lovegrove, Woodinville, WA (US); Yongjun Kim, Mountain View, CA (US); Rajesh Lachhmandas Chhabria, San Jose, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 31 days.

(21) Appl. No.: 17/122,609

(22) Filed: Dec. 15, 2020

(65) Prior Publication Data

US 2022/0164971 A1    May 26, 2022

Related U.S. Application Data

(60) Provisional application No. 63/118,543, filed on Nov. 25, 2020.

(51) Int. Cl.
*G06T 7/521* (2017.01)
*G06T 9/00* (2006.01)
(Continued)

(52) U.S. Cl.
CPC .............. *G06T 7/521* (2017.01); *G06F 18/22* (2023.01); *G06T 5/002* (2013.01); *G06T 9/00* (2013.01)

(58) Field of Classification Search
CPC .......... G06T 7/521; G06T 5/002; G06T 9/00; G06K 9/6201
See application file for complete search history.

(56) References Cited

U.S. PATENT DOCUMENTS

| 10,586,343 B1 | 3/2020 | Whelan et al. |
| 10,805,589 B2 * | 10/2020 | Venkataraman ..... H04N 13/243 |

(Continued)

FOREIGN PATENT DOCUMENTS

| WO | WO-9906950 A2 * | 2/1999 | ............. G01B 11/24 |
| WO | WO-2019125427 A1 * | 6/2019 | ............... G06T 7/55 |

OTHER PUBLICATIONS

Liu et al, High-frequency background modulation fringe patterns based on a fringe-wavelength geometry-constraint model for 3D surface-shape measurement, Jul. 10, 2017, Optics Express, 25(14): 16618-16628. (Year: 2017).*

(Continued)

*Primary Examiner* — Matthew C Bella
*Assistant Examiner* — Kathleen M Broughton
(74) *Attorney, Agent, or Firm* — Morgan, Lewis & Bockius LLP

(57) ABSTRACT

A method for depth sensing from an image of a projected pattern is performed at an electronic device with one or more processors and memory. The method includes receiving an image of a projection of an illumination pattern; for a portion of the image, selecting a candidate image of a plurality of candidate images by comparing the portion of the image with a plurality of candidate images; and determining a depth for the portion of the image based on depth information associated with the selected candidate image. Related electronic devices and computer readable storage medium are also disclosed.

18 Claims, 15 Drawing Sheets

(51) Int. Cl.
*G06T 5/00* (2006.01)
*G06F 18/22* (2023.01)

(56) References Cited

U.S. PATENT DOCUMENTS

| | | |
|---|---|---|
| 2015/0381972 A1 | 12/2015 | Kowdle et al. |
| 2016/0189387 A1* | 6/2016 | Kannan .............. G01B 11/2545 |
| | | 382/106 |
| 2016/0245641 A1* | 8/2016 | Kowdle .................. G06T 7/593 |
| 2017/0039731 A1* | 2/2017 | Liu ......................... G06V 20/64 |
| 2017/0142406 A1* | 5/2017 | Ovsiannikov ........ H04N 13/271 |
| 2020/0204777 A1* | 6/2020 | Goldman ............. H04N 13/239 |

OTHER PUBLICATIONS

Liu et al., Reconstructing 3D point clouds in real time with look-up tables for structured light scanning along both horizontal and vertical directions, Dec. 15, 2019, Optics Letters, 44 (24): 6029-6032. (Year: 2019).*

Li et al, Fast Phase-based Stereo Matching Method for 3D Shape Measurement, Oct. 25, 2010, IEEE 2010 International Symposium on Optomechatronic Technologies, pp. 1-5. (Year: 2010).*

Bell T., et al., "Real-Time 3D Sensing With Structured Light Techniques," In: Interactive Displays: Natural Human-Interface Technologies, Jul. 28, 2014, pp. 181-213.

International Search Report and Written Opinion for International Application No. PCT/US2021/059261, dated Mar. 9, 2022, 11 pages.

* cited by examiner

METHODS FOR DEPTH SENSING USING CANDIDATE IMAGES SELECTED BASED ON AN EPIPOLAR LINE

RELATED APPLICATIONS

This application claims the benefit of, and priority to, U.S. Provisional Patent Application Ser. No. 63/118,543, filed Nov. 25, 2020, which is incorporated by reference herein in its entirety.

TECHNICAL FIELD

The present disclosure generally relates to depth sensing, and particularly to depth sensing for an image.

BACKGROUND

Mobile display devices are widely used for collecting and providing visual information to a user. For example, mobile phones are used for taking photographs and recording videos. Head-mounted display devices are gaining popularity for their ability to provide virtual reality and augmented reality information.

Depth sensing is an important technique for various applications, such as camera operations (e.g., taking photographs and recording videos), augmented reality operations, and security applications (e.g., face recognition, etc.).

However, conventional depth sensing techniques require significant computational resources.

SUMMARY

Therefore, there is a need for a more efficient method that can determine depth from an image. Disclosed herein are methods and devices that can determine depth more efficiently by using candidate images for comparison, where the candidate images are selected based in part on an epipolar line.

In accordance with some embodiments, a method is performed at an electronic device with one or more processors and memory. The method includes receiving an image of a projection of an illumination pattern; for a portion, less than all, of the image, selecting a candidate image of a plurality of candidate images by comparing the portion of the image with a plurality of candidate images; and determining a depth for the portion of the image based on at least a portion of the illumination pattern and the selected candidate image.

In accordance with some embodiments, an electronic device includes one or more processors; and memory storing one or more programs. The one or more programs include instructions for: receiving an image of a projection of an illumination pattern; for a portion, less than all, of the image, selecting a candidate image of a plurality of candidate images by comparing the portion of the image with a plurality of candidate images; and determining a depth for the portion of the image based on at least a portion of the illumination pattern and the selected candidate image.

In accordance with some embodiments, a computer readable storage medium stores one or more programs for execution by one or more processors of an electronic device. The one or more programs include instructions for: receiving an image of a projection of an illumination pattern; for a portion, less than all, of the image, selecting a candidate image of a plurality of candidate images by comparing the portion of the image with a plurality of candidate images; and determining a depth for the portion of the image based on at least a portion of the illumination pattern and the selected candidate image.

Such methods and devices may replace or complement conventional methods and devices for determining a depth from an image.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1A:
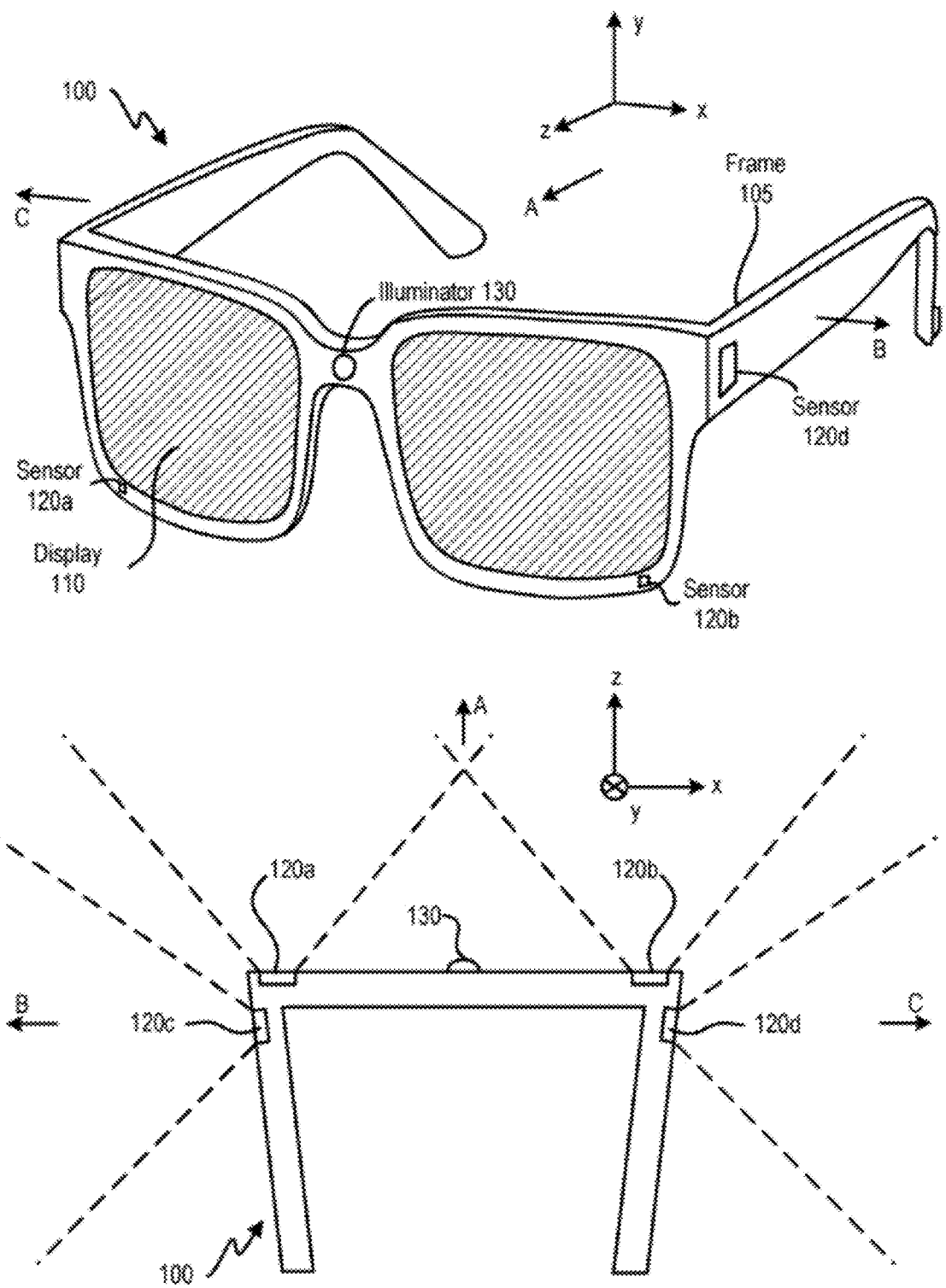
FIGS. 1A and 1B are diagrams of an example of a near-eye display in accordance with some embodiments.

Many depth camera systems operate by observing a scene with two cameras located in parallel to each other and finding correspondences in pixels between the two cameras. The pixel correspondence can then be used to find two rays that intersect at a point on the object surface. Assuming the calibration and the pixel correspondence between the two cameras are accurate, accurate depth can be determined. In particular, the location where the two rays intersect each other represents a point in a three-dimensional space. However, in practice, it is difficult or computationally expensive to match the pixel correspondence perfectly due to various factors, which can lead to error in the depth determination. For example, cameras that rely on the texture of the scene to find correspondences may suffer from the scene content (e.g., white walls or repeating patterns may make it difficult to find the pixel correspondence). In addition, inherent noise in the camera images and any misalignment in the cameras can also increase the error in depth sensing.

Dot-based structured light systems are similar to stereo depth camera systems except that one of the cameras is replaced with a light projector (e.g., a combination of an infrared (IR) camera and an infrared (IR) projector). The light projector is configured to project a predefined pattern of light (also called structured light), and correspondence is determined between the projected pattern (e.g., dots) and pixels in the infrared camera. The use of the predefined pattern eliminates or reduces errors caused by the scene content and also makes finding the correspondence easier. The pattern may be designed in such a way that all local patches in the pattern are unique—i.e. that the pattern of dots presents a unique code which can be used to identify the dot in the center.

The challenge is in finding correspondences between dots in the observed infrared image and the projected dots. While the projected pattern is unique, when the pattern is projected on real world objects, which selectively attenuate the infrared light, or distort the infrared light when the pattern falls on a tilted surface. As a result, finding an exact match between the projected pattern and the detected image can be challenging. Additional image processing operations may be employed to increase the chance of success. However, such operations are computationally expensive.

Accordingly, there is a need for more efficient methods for finding correspondences between the dots in the observed infrared image and the projected dots. The disclosed methods utilize an epipolar line derived for a detected dot on an infrared image, search space can be reduced, which improves the efficiency of stereoscopic matching while reducing the required computational resources.

Reference will now be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In some cases, depth sensing involves determining a depth (or a depth map) from one or more images. The images are collected using an image sensor.

A typical image sensor includes an array of pixel cells. Each pixel cell includes a photodiode to measure the intensity of incident light by converting photons into charge (e.g., electrons or holes). The charge generated by the photodiode can be converted to a voltage by a charge sensing unit, which can include a floating drain node. The voltage can be quantized by an analog-to-digital converter (ADC) into a digital value. The digital value can represent an intensity of light received by the pixel cell and can form a pixel, which can correspond to light received from a spot of a scene. An image comprising an array of pixels can be derived from the digital outputs of the array of pixel cells.

An image sensor can be used to perform different modes of imaging, such as 2D and 3D sensing. The 2D and 3D sensing can be performed based on light of different wavelength ranges. For example, light within a visible wavelength range can be used for 2D sensing, whereas light outside the visible wavelength range (e.g., infrared light) can be used for 3D sensing. An image sensor may include an optical filter array to allow light of different visible wavelength ranges and colors (e.g., red, green, blue, monochrome, etc.) to reach a first set of pixel cells assigned for 2D sensing, and to allow light of the invisible wavelength range to a second set of pixel cells assigned for 3D sensing.

To perform 2D sensing, a photodiode of a pixel cell can generate charge at a rate that is proportional to an intensity of visible light component (e.g., red, green, blue, monochrome, etc.) incident upon the pixel cell, and the quantity of charge accumulated in an exposure period can be used to represent the intensity of visible light (or a certain color component of the visible light). The charge can be stored temporarily at the photodiode and then transferred to a capacitor (e.g., a floating diffusion) to develop a voltage. The voltage can be sampled and quantized by an analog-to-digital converter (ADC) to generate an output corresponding to the intensity of visible light. An image pixel value can be generated based on the outputs from multiple pixel cells configured to sense different color components of the visible light (e.g., red, green, and blue colors).

Moreover, to perform 3D sensing, light of a different wavelength range (e.g., infrared light) can be projected onto an object, and the reflected light can be detected by the pixel cells. The light can include structured light, light pulses, etc. The outputs from the pixel cells can be used to perform depth sensing operations based on, for example, detecting patterns of the reflected structured light, measuring a time-of-flight of the light pulse, etc. To detect patterns of the reflected structured light, a distribution of quantities of charge generated by the pixel cells during the exposure time can be determined, and pixel values can be generated based on the voltages corresponding to the quantities of charge. For time-of-flight measurement, the timing of generation of the charge at the photodiodes of the pixel cells can be determined to represent the times when the reflected light pulses are received at the pixel cells. Time differences between when the light pulses are projected to the object and when the reflected light pulses are received at the pixel cells can be used to provide the time-of-flight measurement.

A pixel cell array can be used to generate information of a scene. In some examples, a subset (e.g., a first set) of the pixel cells within the array can detect visible components of light to perform 2D sensing of the scene, and another subset (e.g., a second set) of the pixel cells within the array can detect an infrared component of the light to perform 3D sensing of the scene. The fusion of 2D and 3D imaging data are useful for many applications that provide virtual-reality (VR), augmented-reality (AR) and/or mixed reality (MR) experiences. For example, a wearable VR/AR/MR system may perform a scene reconstruction of an environment in which the user of the system is located. Based on the reconstructed scene, the VR/AR/MR can generate display effects to provide an interactive experience. To reconstruct a scene, a subset of pixel cells within a pixel cell array can perform 3D sensing to, for example, identify a set of physical objects in the environment and determine the distances between the physical objects and the user. Another subset of pixel cells within the pixel cell array can perform 2D sensing to, for example, capture visual attributes including textures, colors, and reflectivity of these physical objects. The 2D and 3D image data of the scene can then be merged to create, for example, a 3D model of the scene including the visual attributes of the objects. As another example, a wearable VR/AR/MR system can also perform a head tracking operation based on a fusion of 2D and 3D image data. For example, based on the 2D image data, the VR/AR/AR system can extract certain image features to identify an object. Based on the 3D image data, the VR/AR/AR system can track a location of the identified object relative to the wearable device worn by the user. The VR/AR/AR system can track the head movement based on, for example, tracking the change in the location of the identified object relative to the wearable device as the user's head moves.

To improve the correlation of 2D and 3D image data, an array of pixel cells can be configured to provide collocated imaging of different components of incident light from a spot of a scene. Specifically, each pixel cell can include a plurality of photodiodes, and a plurality of corresponding charge sensing units. Each photodiode of the plurality of photodiodes is configured to convert a different light component of incident light to charge. To enable the photodiodes to receive different light components of the incident light, the photodiodes can be formed in a stack which provides different absorption distances for the incident light for different photodiodes, or can be formed on a plane under an array of optical filters. Each charge sensing unit includes one or more capacitors to sense the charge of the corresponding photodiode by converting the charge to a voltage, which can be quantized by an ADC to generate a digital representation of an intensity of an incident light component converted by each photodiode. The ADC includes a comparator. As part of a quantization operation, the comparator can compare the voltage with a reference to output a decision. The output of the comparator can control when a memory stores a value from a free-running counter. The value can provide a result of quantizing the voltage.

There are various performance metrics of an image sensor, such as dynamic range, power, frame rate, etc. The dynamic range can refer to a range of light intensity measurable by the image sensor. For dynamic range, the upper limit can be defined based on the linearity of the light intensity measurement operation provided by the image sensor, whereas the lower limit can be defined based on the noise signals (e.g., dark charge, thermal noise, etc.) that affect the light intensity measurement operation. On the other hand, various factors can affect the frame rate, which can refer to the amount of time it takes for the image sensor to generate an image frame. The factors may include, for example, the time of completion of the quantization operation, various delays introduced to the quantization operation, etc.

To increase the dynamic range of the light intensity measurement operation, the ADC can quantize the voltages based on different quantization operations associated with different intensity ranges. Specifically, each photodiode can generate a quantity of charge within an exposure period, with the quantity of charge representing the incident light intensity. Each photodiode also has a quantum well to store at least some of the charge as residual charge. The quantum well capacity can be set based on a bias voltage on the switch between the photodiode and the charge sensing unit. For a low light intensity range, the photodiode can store the entirety of the charge as residual charge in the quantum well. In a PD ADC quantization operation, the ADC can quantize a first voltage generated by the charge sensing unit from sensing a quantity of the residual charge to provide a digital representation of the low light intensity. As the residual charge is typically much less susceptible to dark current in the photodiode, the noise floor of the low light intensity measurement can be lowered, which can further extend the lower limit of the dynamic range.

Moreover, for a medium light intensity range, the quantum well can be saturated by the residual charge, and the photodiode can transfer the remaining charge as overflow charge to the charge sensing unit, which can generate a second voltage from sensing a quantity of the overflow charge. In a FD ADC quantization operation, the ADC can quantize the second voltage to provide a digital representation of the medium light intensity. For both low and medium light intensities, the one or more capacitors in the charge sensing unit are not yet saturated, and the magnitudes of the first voltage and second voltage correlate with the light intensity. Accordingly for both low and medium light intensities, the comparator of the ADC can compare the first voltage or second voltage against a ramping voltage to generate a decision. The decision can control the memory to store a counter value which can represent a quantity of residual charge or overflow charge.

For a high light intensity range, the overflow charge can saturate the one or more capacitors in the charge sensing unit. As a result, the magnitudes of the second voltage no longer tracks the light intensity, and non-linearity can be introduced to the light intensity measurement. To reduce the non-linearity caused by the saturation of the capacitors, the ADC can perform a time-to-saturation (TTS) measurement operation by comparing the second voltage with a static threshold to generate a decision, which can control the memory to store a counter value. The counter value can represent a time when the second voltage reaches a saturation threshold. The time-to-saturation can represent the intensity of light in a range where the charge sensing unit is saturated and the value second voltage no longer reflects the intensity of light. With such arrangements, the upper limit of the dynamic range can be extended.

On the other hand, the operational speed of the image sensor can be improved based on various techniques, such as reducing the total time of completion of the quantization operations for all the photodiodes of a pixel cell, especially in a case where multiple quantization operations are performed on the charge generated by a photodiode to improve dynamic range, as described above. One way to reduce the total time of completion of the quantization operations is to enable parallel quantization operations for each photodiode by, for example, providing a comparator for each photodiode in a pixel cell, such that each photodiode of the pixel cell has its own dedicated comparator to perform the multiple quantization operations.

While including multiple comparators in each pixel cell of an image sensor can reduce the total time of completion of the quantization operations for each pixel cell and improve the operational speed of the image sensor, such arrangements can substantially increase the power consumption and the size of the pixel cell, both are which are undesirable especially for a wearable application. Specifically, the comparator typically comprises analog circuits (e.g., differential pairs, biasing circuits, output stages, etc.) which consume lots of static current. Moreover, those analog circuits typically use transistor devices that are of a different process node from the digital circuits and the photodiode devices of the pixel cell, and occupy far more spaces than the digital circuits and the photodiode devices. As the advancement in the process technologies further shrinks the sizes of the photodiodes and allows more photodiodes to be included in an image sensor to improve resolution, the power and space required by the comparators can become a bottleneck that limits how many photodiodes can be included in the image sensor, especially in a case where each photodiode is to have a dedicated comparator.

Besides parallelizing the quantization operations for each photodiode in a pixel cell, another way to improve the operational speed of the image sensor is by reducing the various delays introduced to the quantization operation. One source of delay can be the time for moving the quantization results (e.g., pixel data) out of the image sensor to a host device of the application that consumes the quantization results. For example, a subsequent quantization operation may be put on hold to wait for the quantization results of a previous quantization operation to be transferred to the host device. The operation speed of the image sensor can be improved if the hold time of the subsequent quantization operation can be reduced or minimized.

An image sensor described in this application can provide collocated 2D and 3D imaging operations, as well as global shutter operations. For example, an image sensor may include a first photodiode, a second photodiode, a quantizer, a first memory bank, a second memory bank, and a controller. The first photodiode can generate a first charge in response to incident light, whereas the second photodiode can generate a second charge in response to the incident light. The quantizer includes a comparator and is shared between the first photodiode and the second photodiode. The controller can control the quantizer to perform a first quantization operation and a second quantization operation of the first charge to generate, respectively, a first digital output and a second digital output, the first quantization and the second quantization operations being associated with different intensity ranges, and store one of the first digital output or the second digital output in the first memory bank. Moreover, the controller can control the quantizer to perform a third quantization operation of the second charge to generate a third digital output, and 5 store the third digital output in the second memory bank. The third quantization operation is associated with different intensity ranges from at least one of the first or second quantization operations.

In one example, the image sensor may include a charge sensing unit shared between the first photodiode and the second photodiode, and the quantizer can quantize the output of the charge sensing unit. The charge sensing unit may include a capacitor to convert the first charge and the second charge to, respectively, a first voltage and a second voltage, which can be quantized by the quantizer. Specifically, within an exposure time, the controller can first connect the charge sensing unit to the first photodiode to receive a first overflow charge from the first photodiode as part of the first charge, while the first photodiode and the second photodiode 15 accumulate, respectively, the first residual charge (as part of the first charge) and the second residual charge (as part of the second charge). During the exposure period, the first overflow charge stored at the capacitor may develop the first voltage, and the quantizer can perform at least one of the TTS or the FD ADC operation on the first voltage to generate the first digital output.

After the exposure period ends, a PD ADC operation can be performed for the first photodiode, in which the first residual charge accumulated at the first photodiode is transferred to the charge sensing unit to obtain a new first voltage. The new first voltage can be quantized by the quantizer to generate the second digital output. Based on whether the capacitor of the charge sensing unit is saturated by the first overflow charge, and whether the first photodiode is saturated by the first residual charge, one of the first digital output (from either the TTS or the FD ADC operation) or the second digital output (from the PD ADC operation) can be stored in the first memory bank. After the PD ADC operation for the first photodiode completes, the controller can control the second photodiode to transfer the second residual charge to the charge sensing unit to generate the second voltage, and control the quantizer to perform a PD ADC operation on the second voltage to generate the third digital output. The third digital output can be stored in the second memory bank.

The first photodiode and the second photodiode can be part of the same pixel cell or of different pixel cells of the image sensor. The first photodiode and the second photodiode can be configured to detect different components of the incident light. In one example, the first photodiode can be configured to detect visible components of the incident light to generate pixel data for 2D imaging, whereas the second photodiode can be configured to detect infrared components of the incident light to generate pixel data for 3D imaging. The first memory bank can be part of a first memory for storing a 2D image frame, whereas the second memory bank can be part of a second memory for storing a 3D image frame.

The arrangements above can improve the performance and reduce the size and power of an image sensor. Specifically, by providing additional memory banks to store a 2D image frame and a 3D image frame generated from the completed quantization operations, the 2D and 3D image frames can be read out from the memory and transferred to the host device while the subsequent quantization operations for the next frame is underway. Compared with a case where a single memory bank is shared by multiple photodiodes, and the quantization of the output of one photodiode needs to be put on hold until the quantization result stored in the memory bank is read out and can be erased, the arrangements above can reduce the delay introduced to the quantization operations and can improve the operational speed of the image sensor. Moreover, by sharing the comparator between the photodiodes, the power and the size of the image sensor, which is typically dominated by the analog circuits of the comparator, can be reduced. On the other hand, given that the memory banks are typically implemented as digital circuits which occupy much less space and consume much less power than the comparator, including additional memory banks typically do not lead to substantial increase in size and power consumption of the image sensor, especially when the memory banks are fabricated with advanced process technologies.

The image sensor may include additional charge sensing units and additional memory banks, and the mapping between the photodiodes and the memory banks can vary based on different applications. In one example, the image sensor may include two pixel cells, each pixel cell including a pair of photodiodes and a charge sensing unit. The two charge sensing units (of the two pixel cells) can share the comparator. The first photodiode can be of the first pixel cell, whereas the second photodiode can be of the second pixel cell. The comparator can be first connected to the charge sensing unit of the first pixel cell to perform the TTS, FD ADC, and PD ADC operations for the first photodiode, and store the output of one of the operations at the first memory bank. The comparator can then be connected to the charge sensing unit of the second pixel cell to perform the FD ADC and PD ADC operations for the second photodiode, and store the output of one of the operations at the second memory bank. For the other photodiodes in the pixel cells, only PD ADC operations are performed, and the results of the PD ADC operations can be stored in the first and second memory banks after the outputs of the first and second photodiodes have been read out.

As another example, each pixel cell of the image sensor may include four photodiodes sharing a charge sensing unit, and the image sensor may include four memory banks. In some examples, the memory banks can be evenly distributed among the pixel cells, such as having two memory banks to store the outputs of the first pixel cell and the other two memory banks to store the outputs of the second pixel cell. In some examples, the memory banks can be preferentially assigned to store the outputs of a pixel cell based on, for example, the pixel cell being part of a region of interest and the outputs of the pixel cell need to be read out prior to other pixel cells to, for example, dynamically change the quantization operations of the other pixel cells, such as to set the exposure time of the other pixel cells, to enable/disable certain quantization operations of the other pixel cells, etc. As another example, multiple memory banks can be assigned to store the outputs of a photodiode. Such arrangements can be used to enable multiple sampling of the voltage at the charge sensing unit resulted from the accumulation of residual charge/overflow charge, which can improve the resolution of the quantization. In such an example, each of the memory banks can store a digital sample of the voltage, and the digital samples can be read averaged (or otherwise post-processed) to generate the digital output representing the residual charge/overflow charge.

Such image sensors may include, or be implemented in conjunction with, an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120*a*, 120*b*, 120*c*, and 120*d*. Each of image sensors 120*a*, 120*b*, 120*c*, and 120*d* may include a pixel array configured to generate image data representing different fields of views along different directions. For example, sensors 120*a* and 120*b* may be configured to provide image data representing two fields of view towards a direction A along the Z axis, whereas sensor 120*c* may be configured to provide image data representing a field of view towards a direction B along the X axis, and sensor 120*d* may be configured to provide image data representing a field of view towards a direction C along the X axis.

In some examples, sensors 120*a*-120*d* can be configured as input devices to control or influence the display content of the near-eye display 100, to provide an interactive VR/AR/MR experience to a user who wears near-eye display 100. For example, sensors 120*a*-120*d* can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120*a*-120*d* can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infrared light, ultra-violet light, etc.), and can serve various purposes. For example, illuminator 130 may project light in a dark environment (or in an environment with low intensity of infrared light, ultra-violet light, etc.) to assist sensors 120*a*-120*d* in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120*a* or 120*b* can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
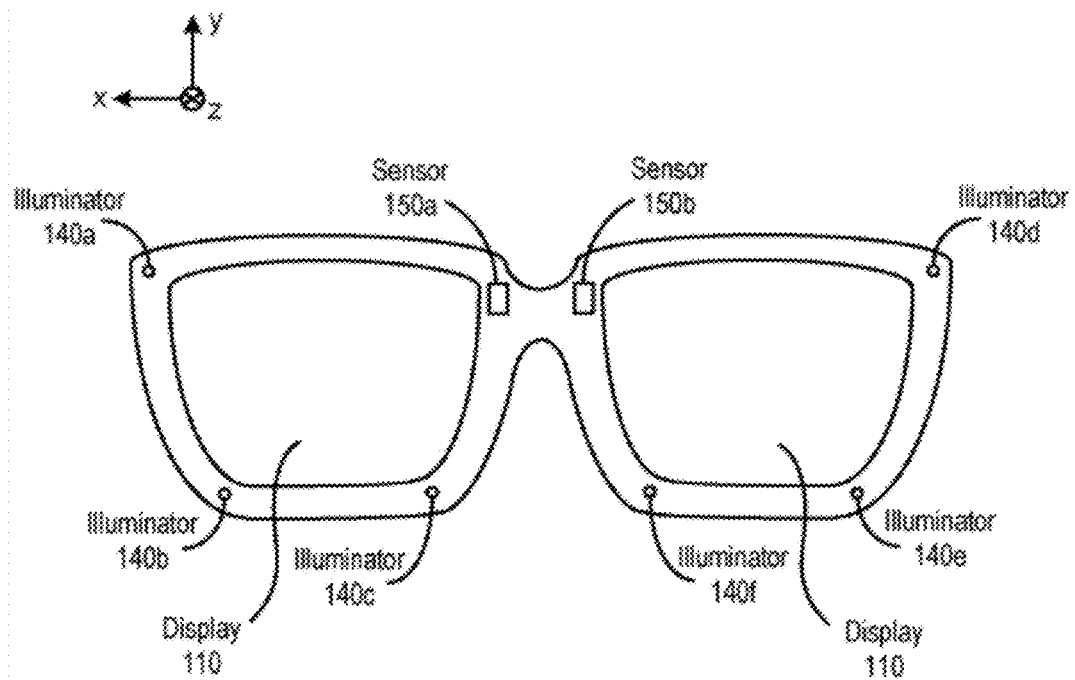
Figure 1B:
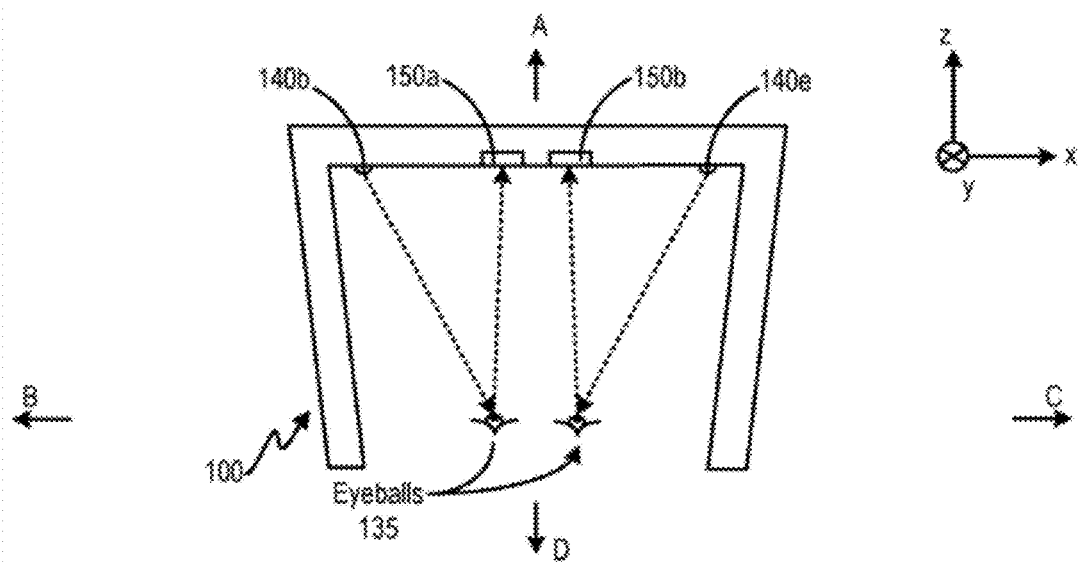

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 10 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 2:
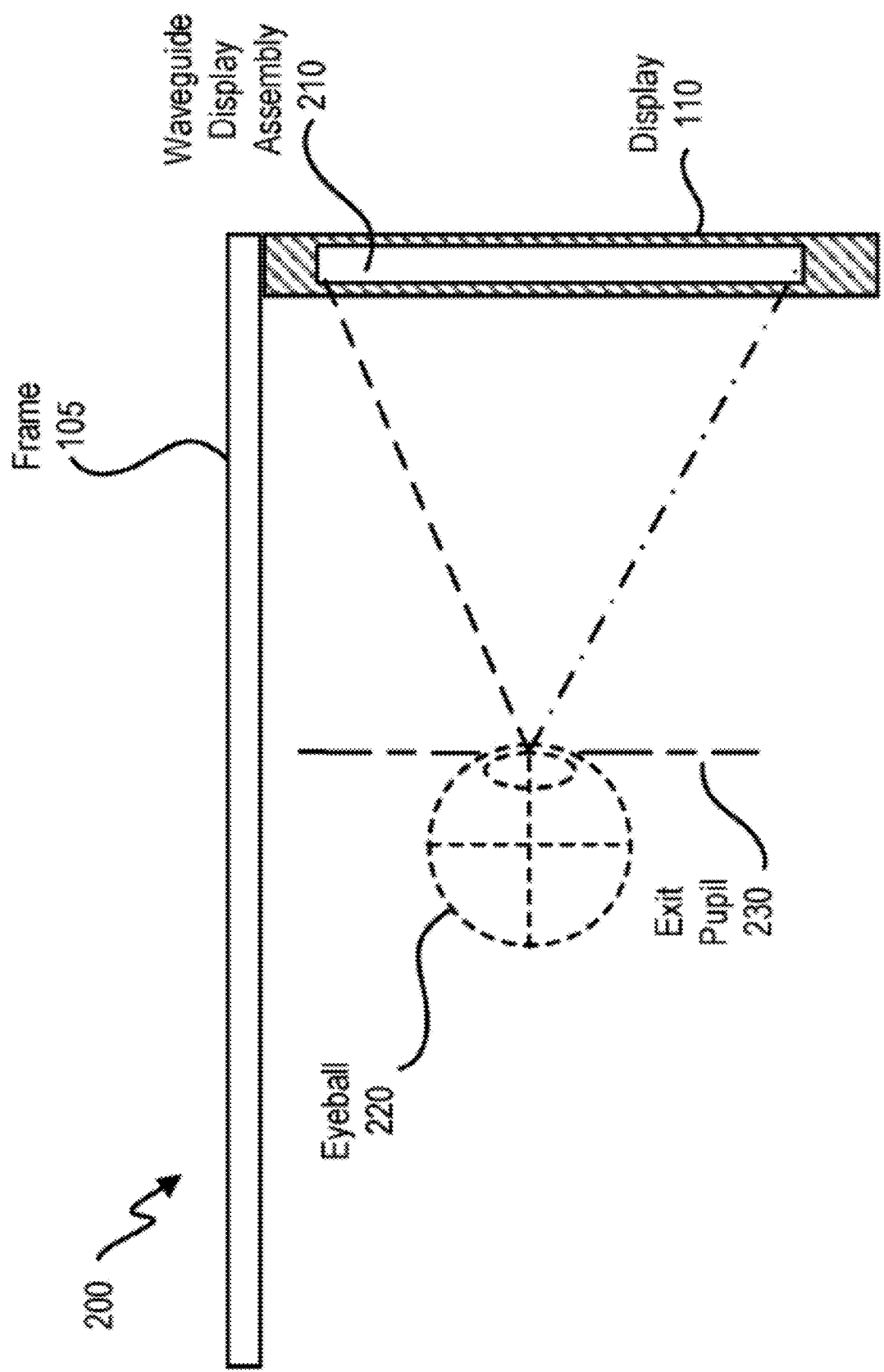
FIG. 2 is an example of a cross section of the near-eye display in accordance with some embodiments.

FIG. 2 is an example of a cross section 200 of near-eye display 100 illustrated in FIGS. 1A and 1B. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
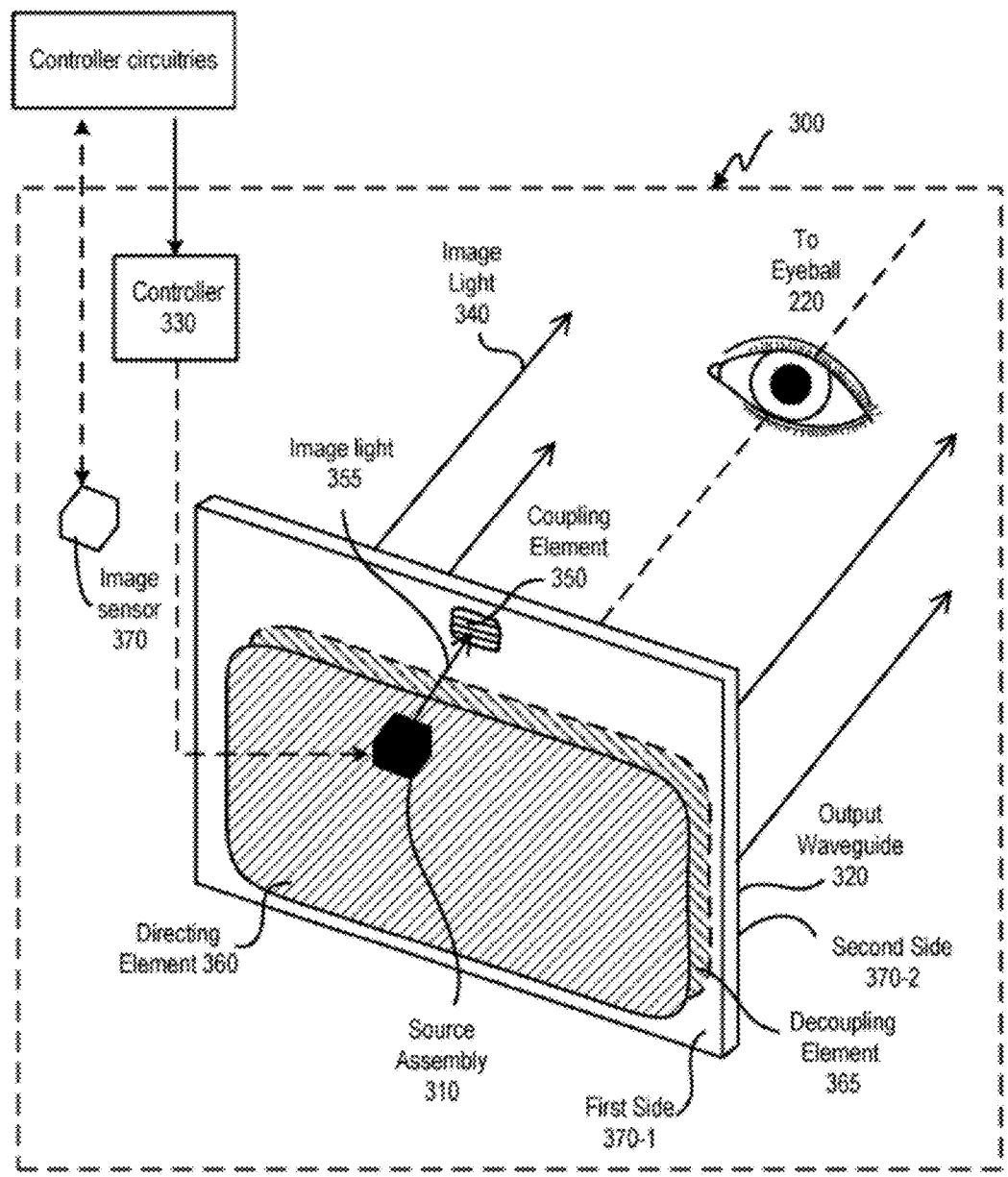
FIG. 3 illustrates an isometric view of an example of a waveguide display with a single source assembly in accordance with some embodiments.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 5 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
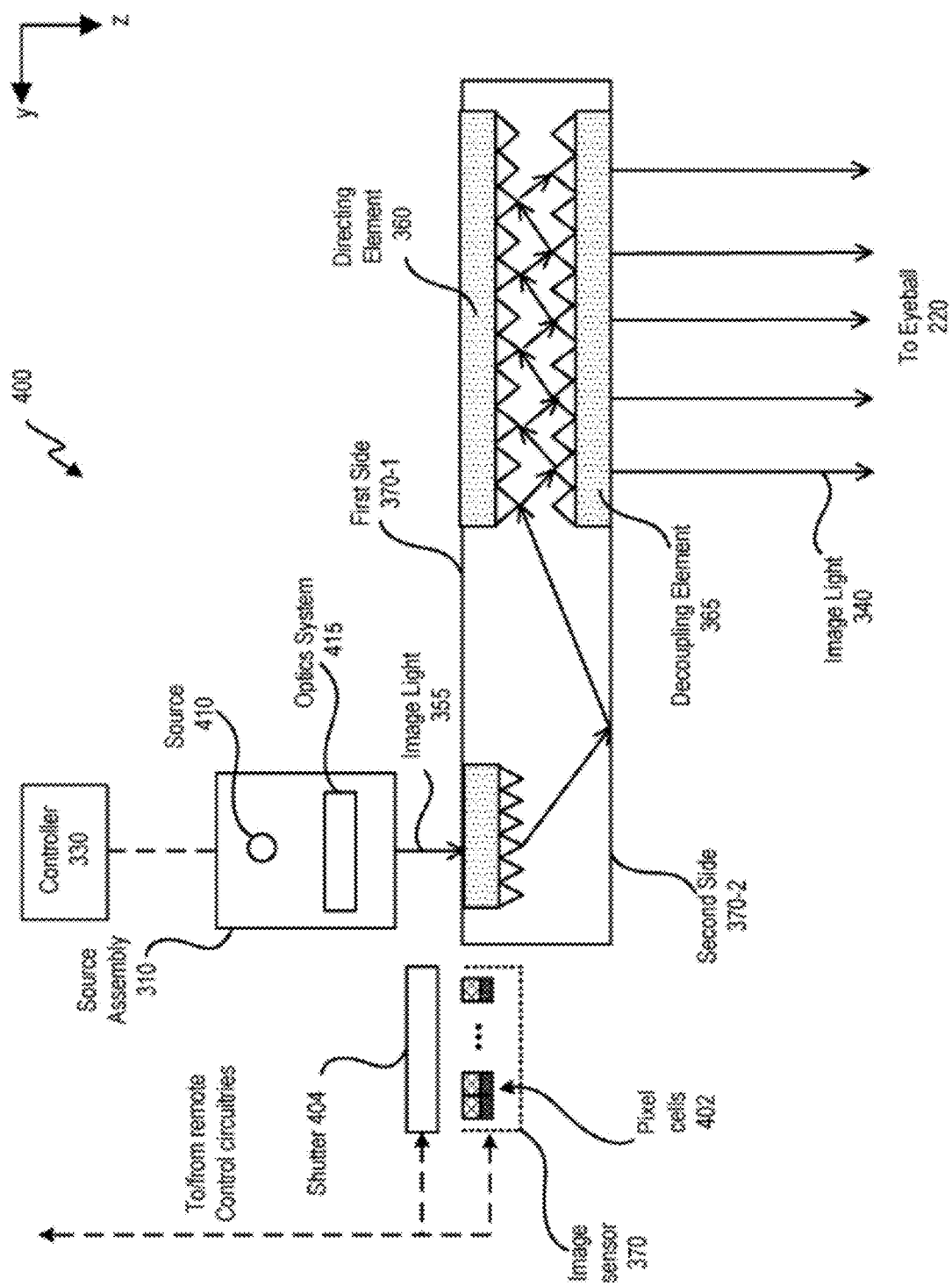
FIG. 4 illustrates a cross section of an example of the waveguide display in accordance with some embodiments.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5A:
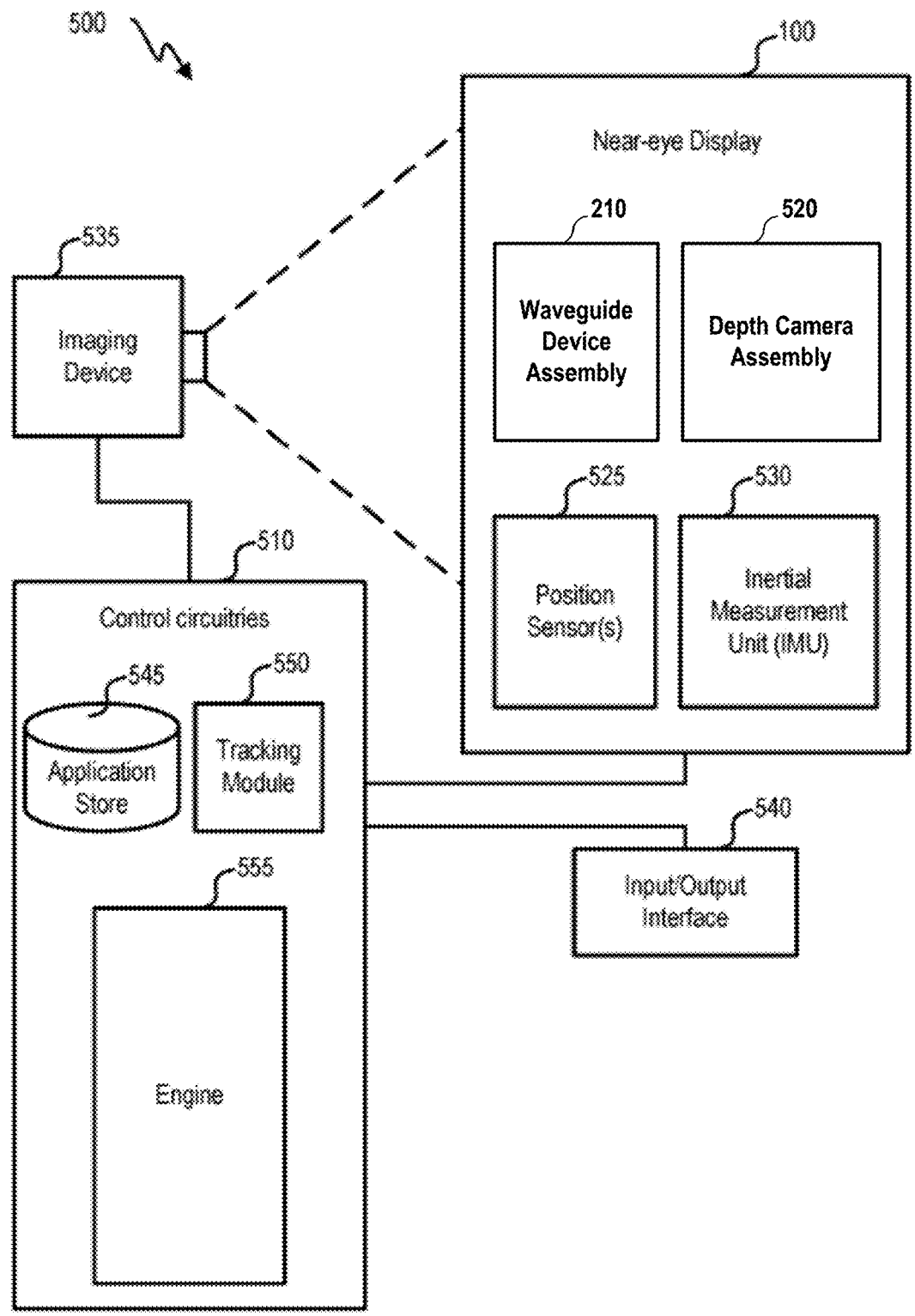
FIG. 5A is a block diagram of an example of a system including the near-eye display in accordance with some embodiments.

FIG. 5A is a block diagram of an example of a system 500 including the near-eye display 100. The system 500 comprises near-eye display 100, an imaging device 535, an input/output interface 540, and image sensors 120a-120d and 150a-150b that are each coupled to control circuits 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuits 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound, etc.).

Near-eye display 100 includes waveguide display assembly 210, depth camera assembly (DCA) 520, one or more position sensors 525, and/or an inertial measurement unit (IMU) 530. Some embodiments of the near-eye display 100 have different components than those described with respect to FIG. 5A. Additionally, the functionality provided by various components described with respect to FIG. 5A may be differently distributed among the components of the near-eye display 100 in other embodiments.

In some embodiments, waveguide display assembly 210 includes source assembly 310, output waveguide 320, and controller 330.

The DCA 120 captures data describing depth information of an area surrounding the near-eye display 100. Some embodiments of the DCA 120 include one or more imaging devices (e.g., a camera, a video camera) and an illumination source configured to emit a structured light (SL) pattern. As further discussed below, structured light projects a specified pattern, such as a symmetric or quasi-random dot pattern, grid, or horizontal bars, onto a scene. For example, the illumination source emits a grid or a series of horizontal bars onto an environment surrounding the near-eye display 100. Based on triangulation, or perceived deformation of the pattern when projected onto surfaces, depth and surface information of objects within the scene is determined.

In some embodiments, to better capture depth information of the area surrounding the near-eye display 100, the DCA 120 also captures time of flight information describing times for light emitted from the illumination source to be reflected from objects in the area surrounding the near-eye display 100 back to the one or more imaging devices. In various implementations, the DCA 120 captures time-of-flight information simultaneously or near-simultaneously with structured light information. Based on the times for the emitted light to be captured by one or more imaging devices, the DCA 120 determines distances between the DCA 120 and objects in the area surrounding the near-eye display 100 that reflect light from the illumination source. To capture time of flight information as well as structured light information, the illumination source modulates the emitted SL pattern with a carrier signal having a specific frequency, such as 30 MHz (in various embodiments, the frequency may be selected from a range of frequencies between 5 MHz and 5 GHz).

The imaging devices capture and record particular ranges of wavelengths of light (e.g., "bands" of light). Example bands of light captured by an imaging device include: a visible band (~380 nm to 750 nm), an infrared (IR) band (~750 nm to 2,200 nm), an ultraviolet band (100 nm to 380 nm), another portion of the electromagnetic spectrum, or some combination thereof. In some embodiments, an imaging device captures images including light in the visible band and in the infrared band. To jointly capture light from the structured light pattern that is reflected from objects in the area surrounding the near-eye display 100 and determine times for the carrier signal from the illumination source to be reflected from objects in the area to the DCA 120, the imaging device includes a detector comprising an array of pixel groups. Each pixel group includes one or more pixels, and different pixel groups are associated with different phase shifts relative to a phase of the carrier signal. In various embodiments, different pixel groups are activated at different times relative to each other to capture different temporal phases of the pattern modulated by the carrier signal emitted by the illumination source. For example, pixel groups are activated at different times so that adjacent pixel groups capture light having approximately a 90, 180, or 270 degree phase shift relative to each other. The DCA 120 derives a phase of the carrier signal, which is equated to a depth from the DCA 120, from signal data captured by the different pixel groups. The captured data also generates an image frame of the spatial pattern, either through summation of the total pixel charges across the time domain, or after correct for the carrier phase signal.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuits 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuits 510. An action request is a request to perform a particular action. For example, an action request may be to start or end an application or to perform a particular action within the application.

Control circuits 510 provide media to near-eye display 100 for presentation to the user in accordance with information received from one or more of: imaging device 535, near-eye display 100, and input/output interface 540. In some examples, control circuits 510 can be housed within system 500 configured as a head-mounted device. In some examples, control circuits 510 can be a standalone console device communicatively coupled with other components of system 500. In the example shown in FIG. 5, control circuits 510 include an application store 545, a tracking module 550, and an engine 555.

The application store 545 stores one or more applications for execution by the control circuits 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 5B:
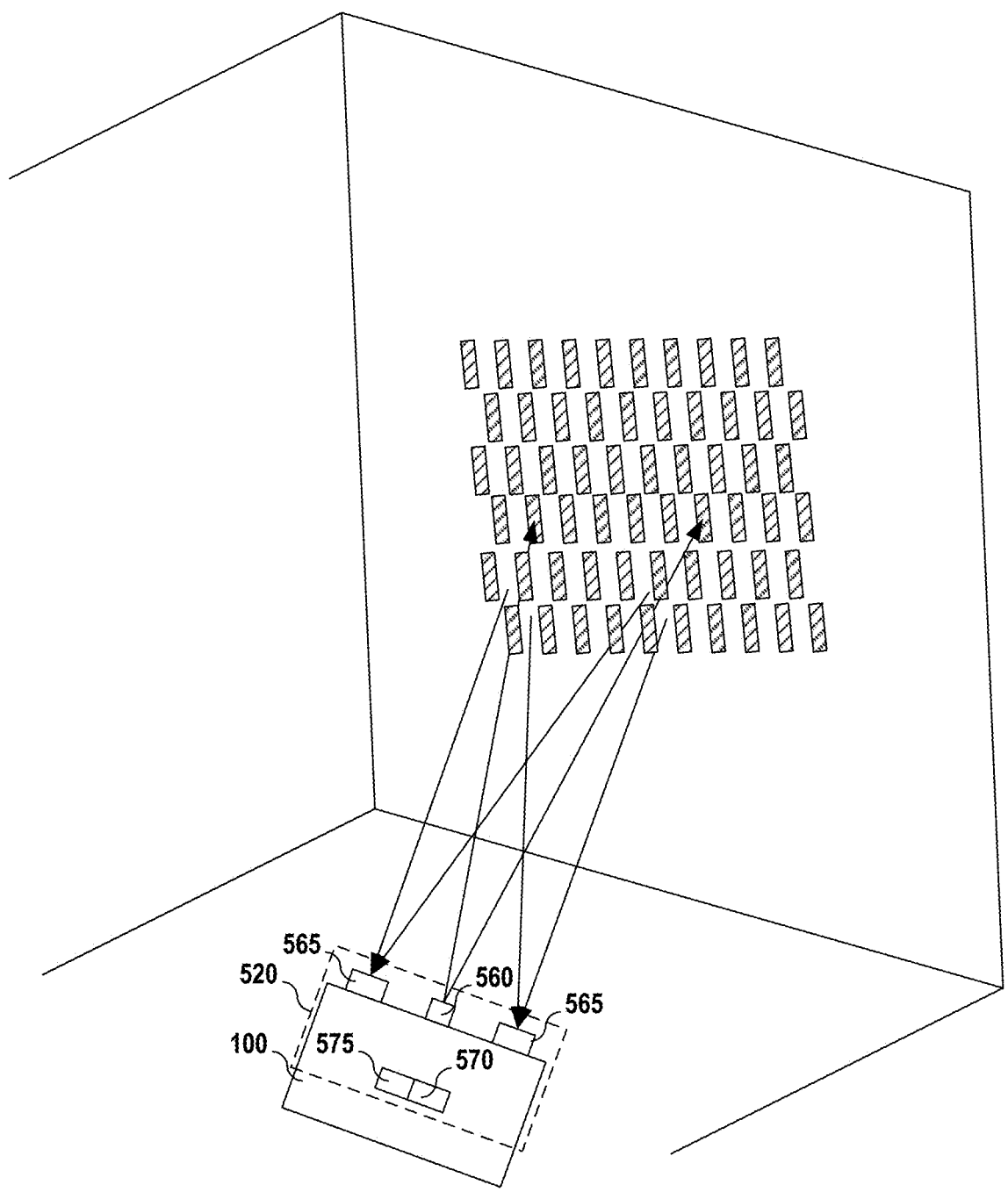
FIG. 5B is a schematic diagram illustrating imaging device and an illumination source for stereoscopic imaging, in accordance with some embodiments.

FIG. 5B shows an example arrangement of one or more imaging device 565 and an illumination source 560 of the DCA 520, where the illumination source 560 projects a structured light pattern (also referred to as a spatial pattern) onto a local area. In some embodiments, the illumination source 560 is an image projector (e.g., a combination of a light source, a spatial light modulator, and projection optics). In some embodiments, the illumination source 560 is configured to change the projected patterns (e.g., using the spatial light modulator). In some embodiments, the illumination source 560 is configured to provide a fixed light pattern (e.g., the illumination source 560 includes a fixed pattern mask instead of a spatial light modulator, which can be dynamically adjusted to provide different patterns at different times). In FIG. 5B, the example spatial pattern comprises a grid pattern projected within a field of view of the illumination source 560. Through scattered or direct reflection, the spatial pattern is captured by the imaging devices 565. In some embodiments, the captured spatial pattern is stored in memory 570 of the DCA 520. One or more processors 575 of the DCA 520, through triangulation, determines the three-dimensional layout of the local area based on the captured image(s) of the projected structure light.

In some embodiments, two imaging devices 565 are used for stereoscopic measurements. In some embodiments, only one imaging device 565 is used. Instead of finding correspondences between images collected by imaging devices, correspondence is determined between a pattern of light projected from the illumination source 560 and the image collected by the imaging device 565.

Figure 6A:
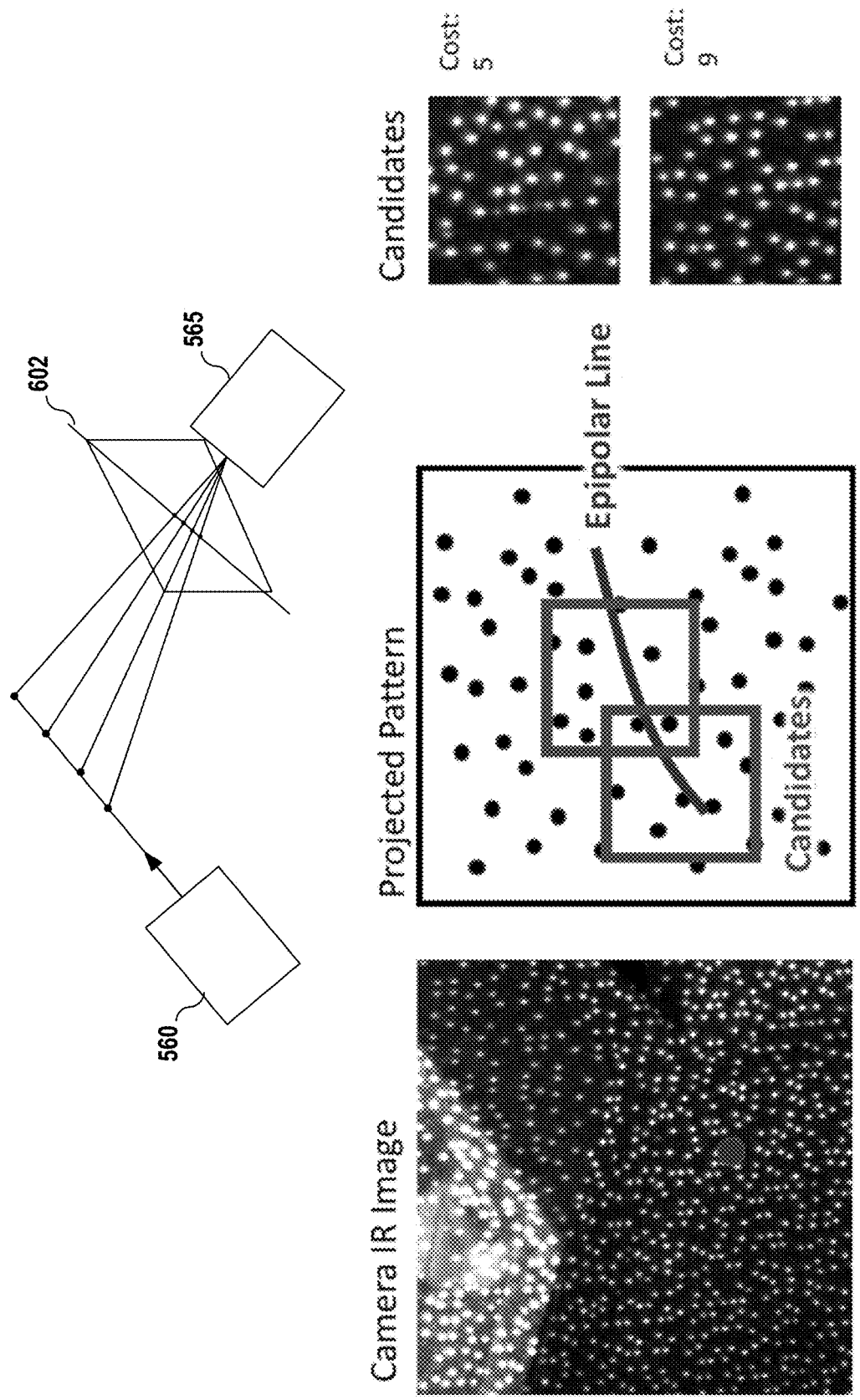
FIG. 6A is a schematic diagram illustrating matching a portion of a collected image using an epipolar line and selected candidate patches in accordance with some embodiments.

FIG. 6A is a schematic diagram illustrating an overview of a method of matching a portion of a collected image using an epipolar line and selected candidate patches in accordance with some embodiments.

Shown on the top side of FIG. 6A is a schematic diagram illustrating an epipolar line. A respective ray projected by the illumination source 560 (which would be observed as a point to an imaging device collocated with the illumination source 560) appears as a line on an image plane of the imaging device 565. Thus, for a respective point detected by the imaging device 565, there is a corresponding epipolar line. The epipolar line corresponding to the respective point on the image is predetermined (e.g., premeasured from a given configuration of the illumination source 560 and the imaging device 565), and in some configurations, stored in memory 570 of the DCA 520.

Shown on the left side of FIG. 6A is an image (e.g., an infrared image) of a structured light pattern projected by the illumination source 560, where the image is collected by the imaging device 560. The image contains a plurality of markers (e.g., dots) that are part of the projected structured light pattern. In some embodiments, as shown in FIG. 6A, the projected pattern is unique for each region (e.g., a region having a predefined size, such as a region that corresponds to 16-by-16, 24-by-24, 28-by-28, 32-by-32, 36-by-36, 40-by-40, 44-by-44, or 48-by-48 pixels on the imaging device). Projecting a pattern containing uniquely identifiable regions instead of projecting a uniform (or regular) pattern as shown in FIG. 5B facilitates identification of a particular region in the collected image. Each marker (e.g., a dot, such as the dot highlighted in FIG. 6A) in the image of a structured light pattern is associated with an epipolar line from the illumination source.

Shown in the middle of FIG. 6A is a schematic diagram illustrating comparison of one or more portions of the image adjacent to the epipolar line for a particular dot with candidate patches. By comparing the candidate patches only with the one or more portions of the image adjacent to the epipolar line (instead of the full two-dimensional range adjacent to the particular dot), the search space is substantially reduced, and as a result, the efficiency of matching the portion of the image with the candidate patches is improved.

Candidate patches are portions of images of the projected structured light pattern projected by the illumination source 560. In some configurations, the candidate patches collected from images of objects located at different depths are used. In some embodiments, each patch is associated with a particular depth (e.g., a distance from the illumination source 560 or the imaging device 565). Shown on the right side of FIG. 6A are example candidate patches. The associated costs (e.g., a number representing the degree of a match between a particular candidate patch and the selected portion of the image) are also shown.

Figure 6B:
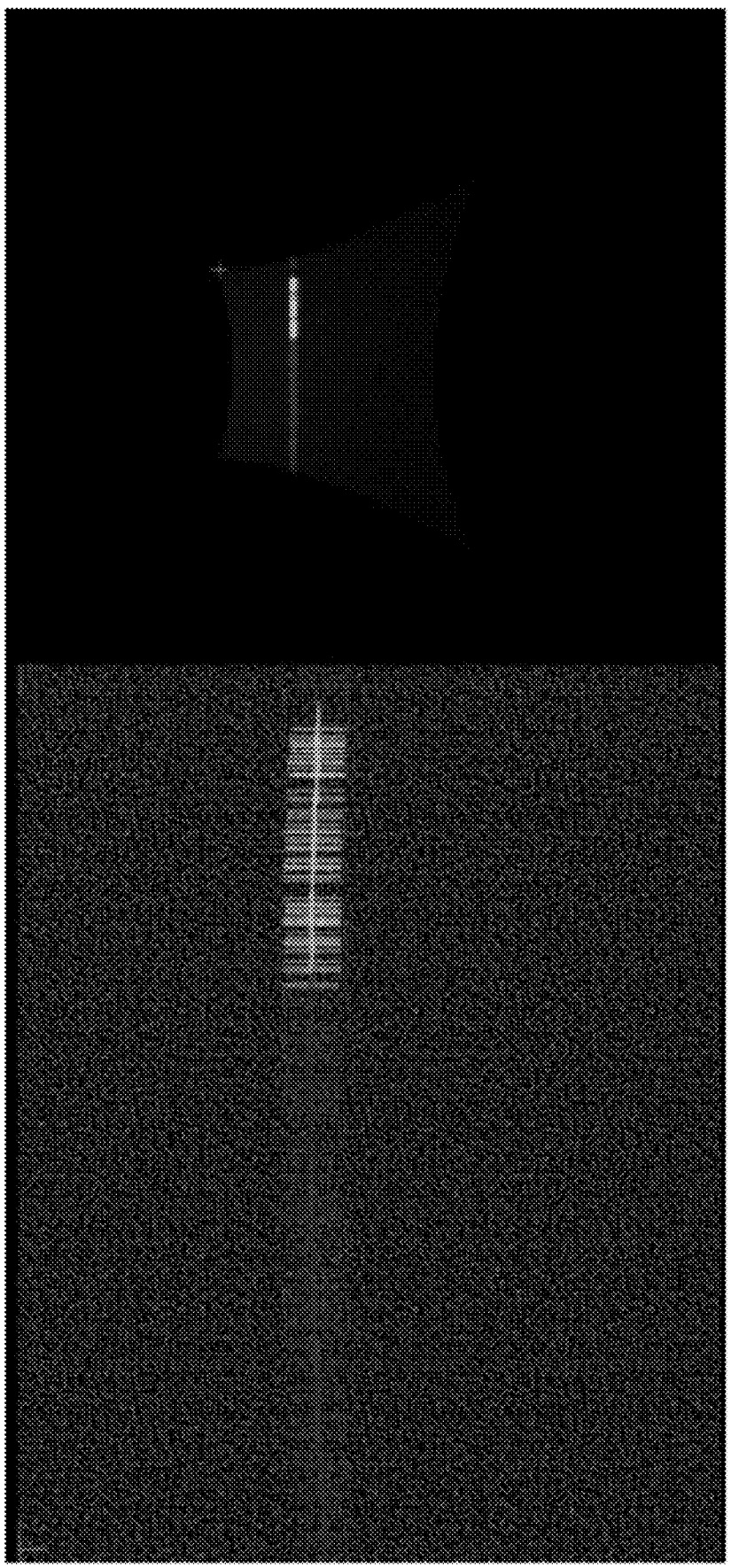
FIG. 6B shows an example image collected by an imaging device and a rectified image in accordance with some embodiments.

FIG. 6B shows on the left side an example image collected by an imaging device and a rectified image in accordance with some embodiments. Shown on the left side is an example image collected by the imaging device 565. The image shows dots (arranged in a pseudo-random pattern, for example) and an epipolar line (shown in red) associated with a particular dot in the image. A portion of the epipolar line (shown in green) represents a region of interest, which is used for matching with candidate patches.

In some configurations, the image collected by the imaging device is distorted due to the off-axis configuration and/or aberrations associated with the optics, and thus, the collected image is rectified to obtain a rectified image shown on the right, and the rectified image is used instead of the collected image.

Figure 6C:
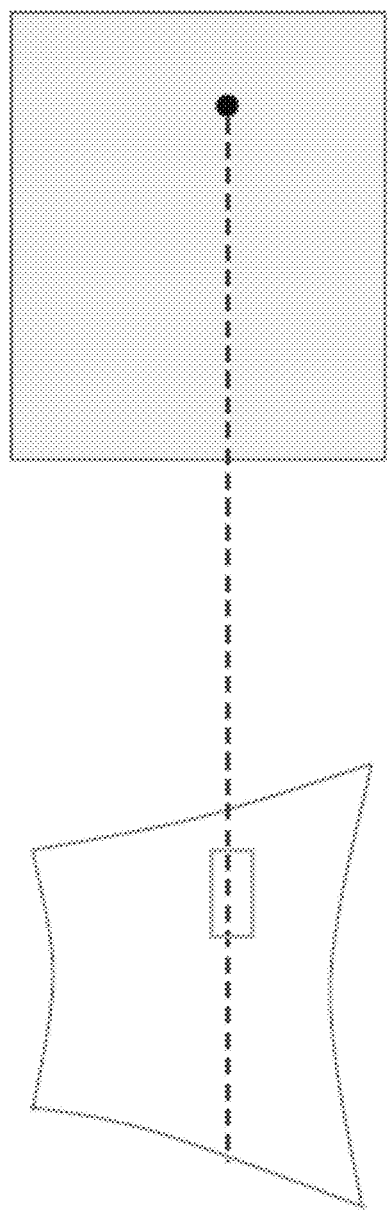
FIG. 6C illustrates example mapping of a region of interest corresponding to a particular dot in an image in accordance with some embodiments.

FIG. 6C illustrates example mapping of a region of interest (shown on the left, highlighted in green) corresponding to a particular dot (shown on the right) in an image in accordance with some embodiments. In some embodiments, the region of interest is selected based on a range of depth for which matching scores are to be calculated.

Figure 6D:
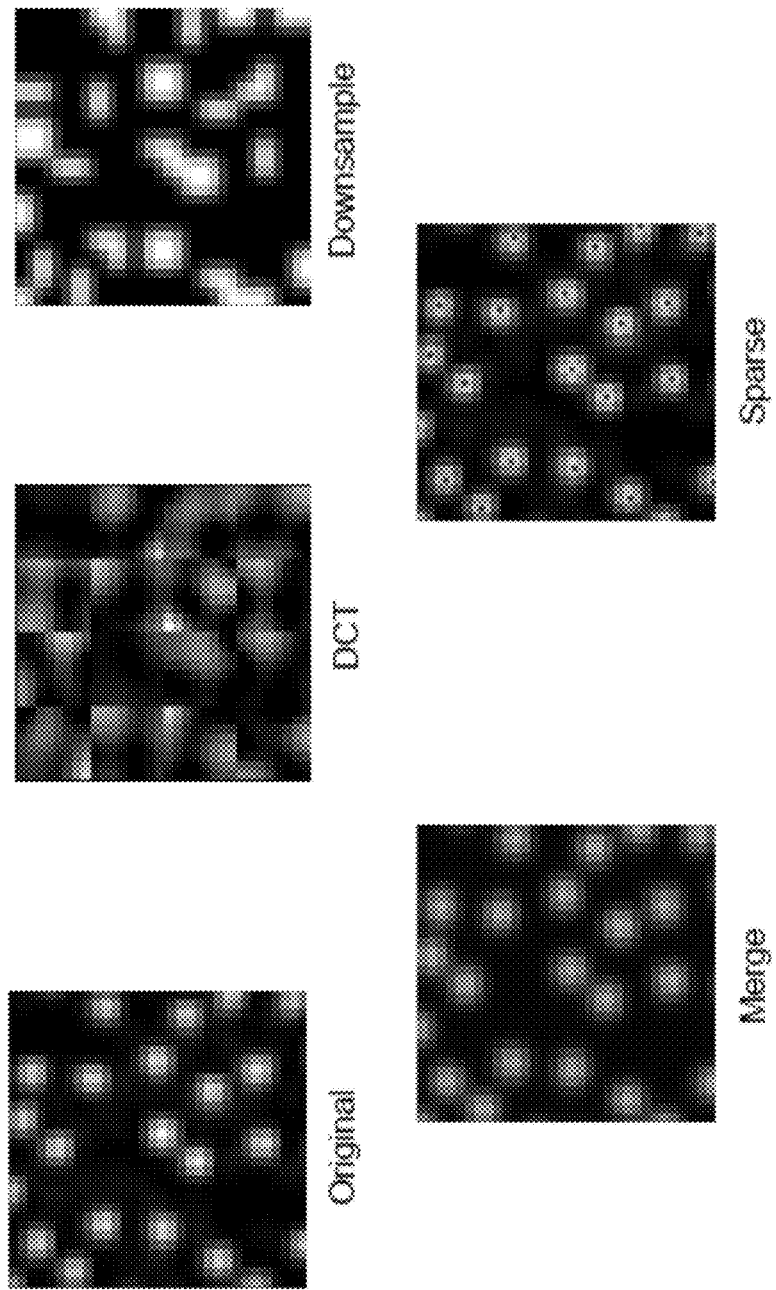
FIG. 6D illustrates an uncompressed patch and corresponding compressed patches in accordance with some embodiments.

FIG. 6D illustrates an uncompressed patch (original) and corresponding compressed patches in accordance with some embodiments. Shown in FIG. 6D are compressed images obtained by compressing the original patch with different compression methods, such as discrete cosine transform (DCT), downsampling, merging, and sparse sampling.

Figure 7A:
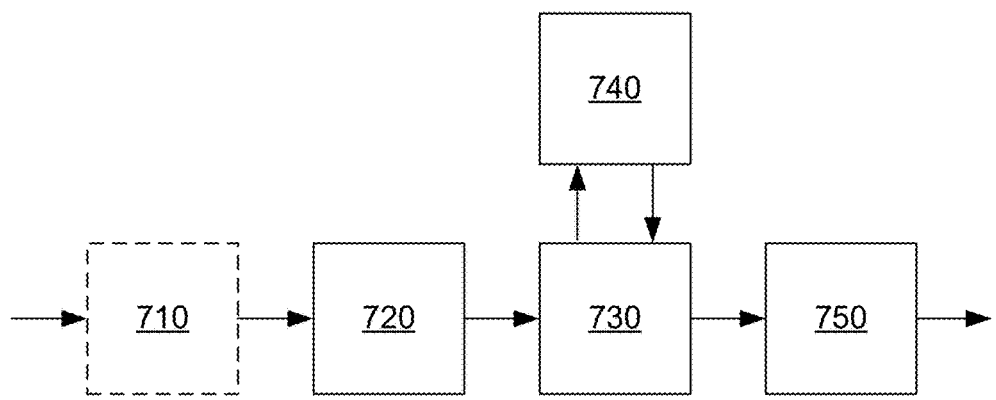
FIG. 7A is a block diagram illustrating a configuration of an electronic device for depth sensing in accordance with some embodiments.

FIG. 7A is a block diagram illustrating a configuration of an electronic device 700 for depth sensing in accordance with some embodiments. The electronic device 700 shown in FIG. 7A stores multiple modules (e.g., instructions) for performing the following operations.

In some embodiments, the electronic device 700 includes a blurring module 710 for blurring the received image. In some embodiments, the received image is blurred by box blurring or Gaussian blurring). Blurring the received image reduces or eliminates noise in the received image (e.g., laser speckles). The noise can interfere with localizing dot centers (e.g., centers of the markers), and thus, blurring the received image improves the accuracy and precision in determining the dot centers.

The electronic device 700 includes a dot extraction module 720 for identifying markers (e.g., dots) or their centers. In some embodiments, the dot extraction module 720 identifies dots by using binarized images (e.g., black and white images, where white areas correspond to dots). In some embodiments, the dot extraction module 720 determines dot centers by using Gaussian fits or calculating centroids of respective dot areas.

Figure 7B:
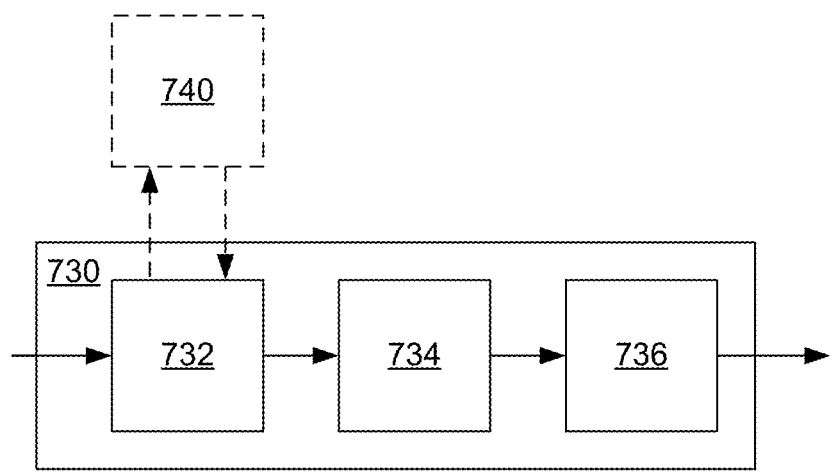
FIG. 7B is a block diagram illustrating components of a candidate selection module in accordance with some embodiments.

The electronic device 700 includes a candidate selection module 730. FIG. 7B is a block diagram illustrating components of the candidate selection module 730 in accordance with some embodiments.

In some embodiments, the candidate selection module 730 includes a candidate lookup module 732 for loading candidate patches.

In some embodiments, the candidate lookup module 732 also includes instructions for identifying a set of relevant candidates (e.g., based on a particular depth range and a corresponding epipolar line) and loading the identified candidates (e.g., into memory for subsequent comparison). For example, the candidate lookup module 732 may include instructions for identifying an epipolar search range using a first lookup table (which may store information identifying an epipolar line associated with a particular dot extracted from the image). In addition, the candidate lookup module 732 may also include instructions for identifying a region-of-interest for candidate matching using a second lookup table. The candidate lookup module 732 may further include instructions for identifying candidate patches using a third lookup table. In some embodiments, the candidate lookup module 732 causes a decompression module 740, which may be included in the electronic device 700, to retrieve compressed patches and decompress the retrieved patches. The decompression module 740, in response to receiving information identifying the set of relevant candidates from the candidate lookup module 732, retrieves compressed candidate patches that correspond to the identified set of relevant candidates (e.g., from memory 570), decompresses the retrieved candidate patches (e.g., using run-length decoding, Huffman decoding, discrete cosine transform (DCT), etc.) and provides the decompressed candidate patches to the candidate selection module 730 (e.g., to the candidate lookup module 732 or the candidate cost module 734).

In some embodiments, the candidate selection module 730 also includes a candidate cost module 734 for determining a matching cost between a portion of the image and candidate patches. For example, the candidate cost module 734 may determine the matching cost using a sum of squared differences (SSD), a sum of absolute differences (SAD), a zero-mean SSD, a zero-mean SAD, a normalized cross-correlation, or a zero-mean normalized cross-correlation.

In some embodiments, the candidate selection module 730 further includes a selection module 736 for selecting one of the candidate patches based on their matching costs (e.g., the matching costs received from the candidate cost module 734). For example, a candidate patch with a lowest cost or a candidate patch with a highest cost may be selected depending on a matching function used to calculate the matching costs.

Searching for a match with a lowest (or highest) cost using a visual difference metric instead of looking for an exact match between the projected pattern and the detected image reduces computational resources required for the matching. For example, a patch of the infrared camera image and a set of candidate patches are compared using a patch cost metric, and the patch with the lowest (or highest) cost is selected as the most likely match. This also eliminates the need for multiple levels of image corrections required for finding the exact match, which also reduces the computational resources required for the matching.

Figure 7C:
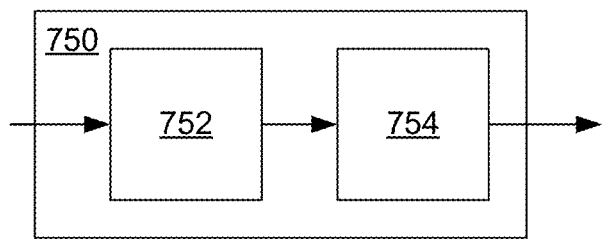
FIG. 7C is a block diagram illustrating components of an outlier rejection and triangulation module in accordance with some embodiments.

Turning back to FIG. 7A, in some embodiments, the electronic device 700 includes a depth determination module 750. FIG. 7C is a block diagram illustrating components of the depth determination module 750 in accordance with some embodiments.

In some embodiments, the depth determination module 750 includes a triangulation module 752 for determining a depth of a dot in the image. In some embodiments, the triangulation module 752 includes instructions for determining a depth of the dot by using triangulation (e.g., based on the known position of the dot in the projected structured light pattern and the detected position of the dot in the detected image). In some embodiments, the triangulation module 752 retrieves depth information corresponding to the dot in the projected structure light pattern and the selected candidate patch.

In some embodiments, the depth determination module 750 includes an outlier rejection module 754 for filtering the determined depth information. For example, outliers that are either geometrically impossible or statistically unlikely are removed. In some embodiments, the outlier rejection module 754 includes instructions for comparing the depth of a particular dot with the depths of dots adjacent to the particular dot and in accordance with a determination that the depth of the particular dot does not satisfy proximity criteria (e.g., the depths need to be within a certain percentage, such as 20%, 15%, 10%, 5%, 3%, or 1%) to the depths of the adjacent dots. In some embodiments, the outlier rejection module 754 identifies a set of dots within a window centered at a particular dot and determine a median depth of the dots within the window. In accordance with a determination that the depth of the particular dot satisfies a predefined threshold (e.g., within 30%, 25%, 20%, 15%, 10%, 5%, 3%, or 1%) of the median depth, the depth of the particular depth is used. In accordance with a determination that the depth of the particular dot does not satisfy the predefined threshold of the median depth, the depth of the particular depth is discarded or replaced with a representative depth (e.g., the median depth or a weighted or unweighted average of depths of the adjacent dots).

Although FIGS. 7A-7C illustrate components of the electronic device 700 with particular modules, in some embodiments, some of the modules may be combined, one or more modules may be implemented in multiple separate modules, and/or some of the modules may be rearranged.

Figure 8:
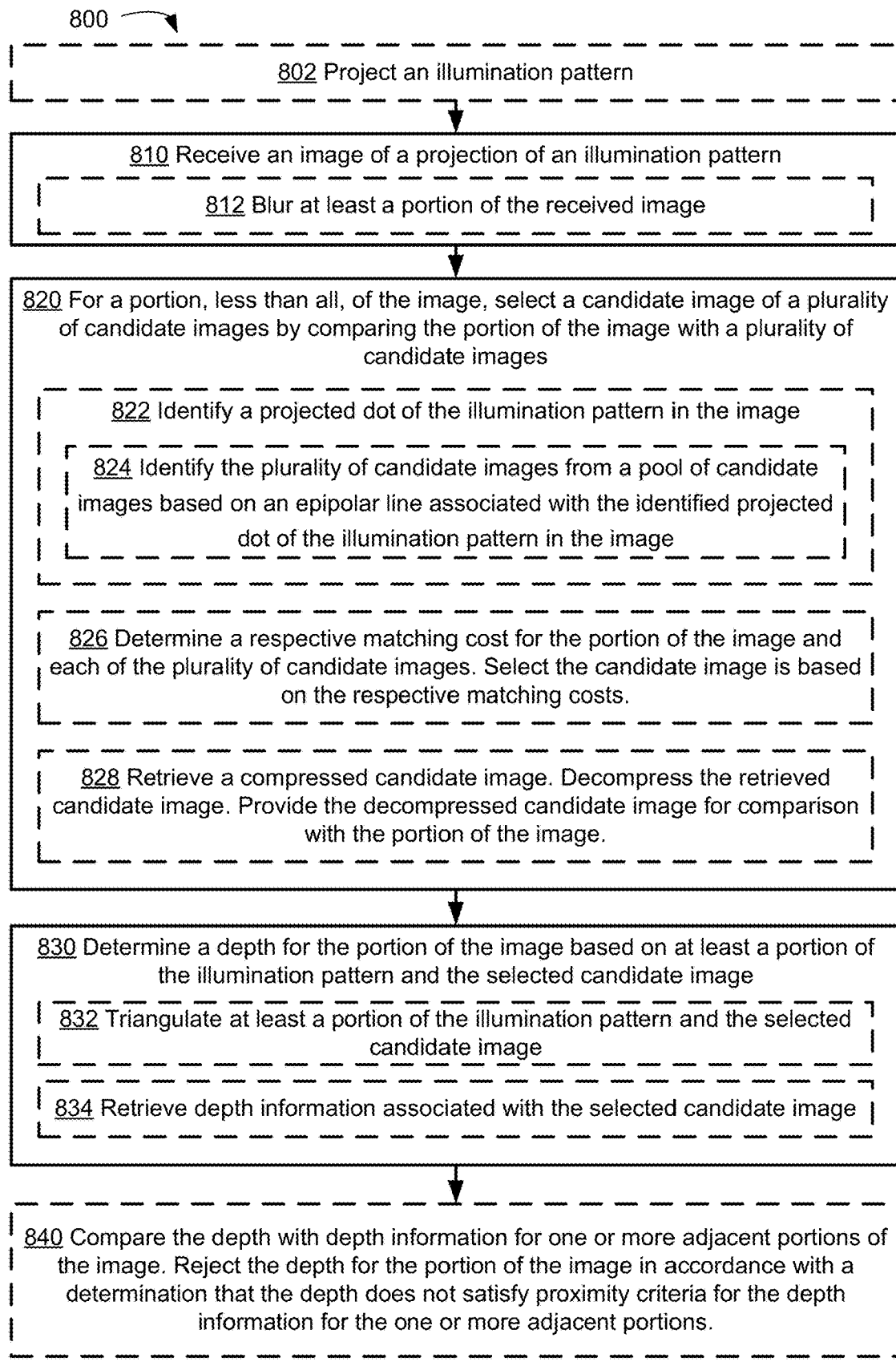
FIG. 8 is a flow diagram illustrating a method for depth sensing in accordance with some embodiments.

FIG. 8 is a flow diagram illustrating a method 800 for depth sensing in accordance with some embodiments.

The method 800 is performed at an electronic device with one or more processors and memory (e.g., depth camera assembly 520 with one or more processors 575 and memory 570).

In some embodiments, the method 800 includes (802) projecting an illumination pattern (e.g., the illumination pattern is projected using the illumination source 560 shown in FIG. 6A).

The method 800 includes (810) receiving an image of a projection of an illumination pattern (e.g., an infrared image collected using the imaging device 565 shown in FIG. 6A is received by the electronic device 700 shown in FIG. 7A).

In some embodiments, the method 800 includes (812) blurring (e.g., using the blurring module 710) at least a portion of the received image (e.g., prior to comparing the portion of the received image with a plurality of candidate images).

The method 800 includes (820), for a portion, less than all, of the image, selecting (e.g., using the candidate selection module 730, and in some embodiments, the selection module 736) a candidate image of a plurality of candidate images by comparing the portion of the image with a plurality of candidate images.

In some embodiments, the method 800 includes (822) identifying a projected dot (or a marker) of the illumination pattern in the image (e.g., using the dot extraction module 720).

In some embodiments, the method 800 includes (824) identifying the plurality of candidate images from a pool of candidate images based on an epipolar line associated with the identified projected dot of the illumination pattern in the image (e.g., using the candidate lookup module 732).

In some embodiments, comparing the portion of the image with the plurality of candidate images includes (826) determining a respective matching cost for the portion of the image and each of the plurality of candidate images, and selecting the candidate image is based on the respective matching costs (e.g., using the candidate cost module 734).

In some embodiments, the method 800 includes (828) retrieving a compressed candidate image and decompressing the retrieved candidate image; and providing the decompressed candidate image for comparison with the portion of the image (e.g., using the decompression module 740).

The method 800 includes (830) determining a depth for the portion of the image based on at least a portion of the illumination pattern and the selected candidate image (e.g., using the depth determination module 750).

In some embodiments, determining the depth for the portion of the image includes (832) triangulating at least a portion of the illumination pattern and the selected candidate image (e.g., using the triangulation module 752).

In some embodiments, determining the depth for the portion of the image includes (834) retrieving depth information associated with the selected candidate image (e.g., using a lookup table).

In some embodiments, the method 800 includes (840) comparing the depth for the portion of the image with depth information for one or more other portions of the image that are adjacent to the portion of the image; and rejecting the depth for the portion of the image in accordance with a determination that the depth for the portion of the image does not satisfy proximity criteria for the depth information for the one or more other portions (e.g., using the outlier rejection module 754).

Some portions of this application describe the examples in terms of particular operations on information. These descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples in this application may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Although some of various drawings illustrate a number of operations in a particular order, operations which are not order dependent may be reordered and other operations may be combined or broken out. While some reordering or other groupings are specifically mentioned, others will be apparent to those of ordinary skill in the art, so the ordering and groupings presented herein are not an exhaustive list of alternatives.

It will also be understood that, although the terms first, second, etc. are, in some instances, used herein to describe various elements, these elements should not be limited by these terms. These terms are used only to distinguish one element from another.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method performed at an electronic device with one or more processors and memory, the method comprising:
   receiving, with the one or more processors, an image of a projection of an illumination pattern;
   identifying, with the one or more processors, a projected dot of the illumination pattern in the image;
   identifying, with the one or more processors, an epipolar line associated with the identified projected dot of the illumination pattern in the image using a first lookup table storing information identifying a respective epipolar line for a respective projected dot extracted from the image;
   identifying, with the one or more processors, a plurality of candidate images from a pool of candidate images based on the epipolar line associated with the identified projected dot of the illumination pattern in the image;
   for a portion, less than all, of the image, selecting, with the one or more processors, a candidate image of the plurality of candidate images by comparing the portion of the image with the plurality of candidate images; and
   determining, with the one or more processors, a depth for the portion of the image based on at least a portion of the illumination pattern and the selected candidate image.

2. The method of claim 1, further comprising:
   projecting, with one or more light sources, the illumination pattern.

3. The method of claim 1, further comprising:
   blurring at least a portion of the received image prior to comparing the portion of the image with the plurality of candidate images.

4. The method of claim 1, wherein:
   comparing the portion of the image with the plurality of candidate images includes determining a respective matching cost for the portion of the image and each of the plurality of candidate images; and
   selecting the candidate image is based on the respective matching costs.

5. The method of claim 1, further comprising:
   retrieving a compressed candidate image;
   decompressing the retrieved candidate image; and
   providing the decompressed candidate image for comparison with the portion of the image.

6. The method of claim 1, wherein:
   determining the depth for the portion of the image includes triangulating at least a portion of the illumination pattern and the selected candidate image.

7. The method of claim 1, wherein:
   determining the depth for the portion of the image includes retrieving depth information associated with the selected candidate image.

8. The method of claim 1, further comprising:
   comparing the depth for the portion of the image with depth information for one or more other portions of the image that are adjacent to the portion of the image; and
   rejecting the depth for the portion of the image in accordance with a determination that the depth for the portion of the image does not satisfy proximity criteria for the depth information for the one or more other portions.

9. The method of claim 1, including:
   identifying, with the one or more processors, a region of interest for candidate matching using a second lookup table that includes information identifying a portion of the respective epipolar line as the region of interest.

10. The method of claim 9, including:
identifying, with the one or more processors, the plurality of candidate images using a third lookup table that includes information identifying candidate patches collected from images of objects located at different depths.

11. An electronic device comprising:
one or more processors; and
memory storing one or more programs, the one or more programs including instructions for:
receiving an image of a projection of an illumination pattern;
identifying a projected dot of the illumination pattern in the image;
identifying, with the one or more processors, an epipolar line associated with the identified projected dot of the illumination pattern in the image using a first lookup table storing information identifying a respective epipolar line for a respective projected dot extracted from the image;
identifying a plurality of candidate images from a pool of candidate images based on the epipolar line associated with the identified projected dot of the illumination pattern in the image;
loading onto the memory of the electronic device the plurality of candidate images;
for a portion, less than all, of the image, selecting a candidate image of the plurality of candidate images by comparing the portion of the image with the plurality of candidate images loaded on the memory of the electronic device; and
determining a depth for the portion of the image based on at least a portion of the illumination pattern and the selected candidate image.

12. The electronic device of claim 11, wherein the one or more programs include instructions for:
blurring at least a portion of the received image prior to comparing the portion of the image with the plurality of candidate images.

13. The electronic device of claim 11, wherein the one or more programs include instructions for:
retrieving a compressed candidate image;
decompressing the retrieved candidate image; and
providing the decompressed candidate image for comparison with the portion of the image.

14. The electronic device of claim 11, wherein the one or more programs include instructions for:
comparing the depth for the portion of the image with depth information for one or more other portions of the image that are adjacent to the portion of the image; and
rejecting the depth for the portion of the image in accordance with a determination that the depth for the portion of the image does not satisfy proximity criteria for the depth information for the one or more other portions.

15. A non-transitory computer readable storage medium storing one or more programs for execution by one or more processors of an electronic device, the one or more programs including instructions for:
receiving an image of a projection of an illumination pattern;
identifying a projected dot of the illumination pattern in the image;
identifying, with the one or more processors, an epipolar line associated with the identified projected dot of the illumination pattern in the image using a first lookup table storing information identifying a respective epipolar line for a respective projected dot extracted from the image;
identifying a plurality of candidate images from a pool of candidate images based on the epipolar line associated with the identified projected dot of the illumination pattern in the image;
loading onto memory of the electronic device the plurality of candidate images;
for a portion, less than all, of the image, selecting a candidate image of the plurality of candidate images by comparing the portion of the image with the plurality of candidate images loaded on the memory of the electronic device; and
determining a depth for the portion of the image based on at least a portion of the illumination pattern and the selected candidate image.

16. The computer readable storage medium of claim 15, wherein the one or more programs include instructions for:
blurring at least a portion of the received image prior to comparing the portion of the image with the plurality of candidate images.

17. The computer readable storage medium of claim 15, wherein the one or more programs include instructions for:
retrieving a compressed candidate image;
decompressing the retrieved candidate image; and
providing the decompressed candidate image for comparison with the portion of the image.

18. The computer readable storage medium of claim 15, wherein the one or more programs include instructions for:
comparing the depth for the portion of the image with depth information for one or more other portions of the image that are adjacent to the portion of the image; and
rejecting the depth for the portion of the image in accordance with a determination that the depth for the portion of the image does not satisfy proximity criteria for the depth information for the one or more other portions.

* * * * *